US006929036B2

(12) United States Patent
Awad

(10) Patent No.: US 6,929,036 B2
(45) Date of Patent: Aug. 16, 2005

(54) AUTOMOTIVE FLUID EXCHANGE SYSTEM AND METHOD OF USE

(76) Inventor: Adam Awad, 160 Fairhaven La., Costa Mesa, CA (US) 92626

( * ) Notice: Subject to any disclaimer, the term of this patent is extended or adjusted under 35 U.S.C. 154(b) by 127 days.

(21) Appl. No.: 10/666,583

(22) Filed: Sep. 17, 2003

(65) Prior Publication Data

US 2005/0061394 A1 Mar. 24, 2005

(51) Int. Cl.⁷ .............................................. B65B 1/04
(52) U.S. Cl. ............................ 141/65; 141/59; 184/1.5
(58) Field of Search ............................. 141/64, 65, 67, 141/98, 59; 184/1.5

(56) References Cited

U.S. PATENT DOCUMENTS

| | | | |
|---|---|---|---|
| 3,548,978 A | 12/1970 | Dyke .......................... | 188/152 |
| 4,415,071 A | 11/1983 | Butler et al. ................. | 188/352 |
| 5,060,703 A * | 10/1991 | Koerner ....................... | 141/59 |
| 5,291,968 A | 3/1994 | Brown ........................ | 184/1.5 |
| 5,415,247 A | 5/1995 | Knorr ......................... | 184/1.5 |
| 5,427,505 A * | 6/1995 | Payne ......................... | 417/149 |
| 5,497,864 A | 3/1996 | Oien .......................... | 188/352 |
| 5,964,326 A | 10/1999 | Lee et al. .................... | 188/352 |
| 6,206,055 B1 | 3/2001 | Hollub et al. ................. | 141/98 |
| 6,302,167 B1 | 10/2001 | Hollub et al. ................. | 141/98 |
| 6,443,192 B1 | 9/2002 | Erwin et al. .................. | 141/65 |
| 6,536,486 B2 | 3/2003 | Erwin et al. .................. | 141/65 |
| 6,772,803 B2 * | 8/2004 | Awad .......................... | 141/65 |
| 2003/0037837 A1 | 2/2003 | Erwin et al. .................. | 141/65 |

* cited by examiner

Primary Examiner—Steven O. Douglas
(74) Attorney, Agent, or Firm—Gene Scott; Patent Law & Venture Group

(57) ABSTRACT

Replacing fluid in a sealed system interconnected by fluid conduction tubes with a lower port of a spent fluid container and a lower port of a new fluid container. A fluid pump is interconnected by the fluid conductors in such manner as to suck air from an upper port of the spent fluid container, thereby urging spent fluid from the system into the spent fluid container, and simultaneously forcing air into an upper port of the new fluid container thereby urging new fluid into the system to replace the spent fluid.

14 Claims, 3 Drawing Sheets

AUTOMOTIVE FLUID EXCHANGE SYSTEM AND METHOD OF USE

INCORPORATION BY REFERENCE

Applicant(s) hereby incorporate herein by reference, any and all U.S. patents, U.S. patent applications, and other documents and printed matter cited or referred to in this application.

BACKGROUND OF THE INVENTION

1. Field of the Invention

This invention relates generally to automotive fluid systems and methods of use and more particularly to a brake fluid exchange system and method of use.

2. Description of Related Art

The following art defines the present state of this field:

Dyke, U.S. Pat. No. 3,548,978 describes an apparatus that permits a single operator, with a minimal amount of labor, to bleed trapped air from the hydraulic brake system of a vehicle. A mobile carrier carries a brake fluid auxiliary supply source with a pump extending to the interior of the source to pump fluid through a pump line to the fluid reservoir of a master cylinder of the system which in turn extends to a wheel cylinder having a bleed valve port. A universal type connecting sealer may join the pump line for securing the pump line to the master cylinder about a filler opening extending to the reservoir. A discharge tube is fitted to bleed valve port and extends to a hand carriable discharge reservoir.

Butler et al., U.S. Pat. No. 4,415,071 describes a control unit affixed to an adjustable stand mounted on a platform on wheels, having an electrical on/off switch which controls the vacuum pump of the extractor unit, a brake fluid and air extractor control valve which controls the flow of air and brake fluid being extracted from the master cylinder and brake system, a brake fluid application control valve which controls the flow of brake fluid (free of air) from the brake fluid reservoir container (with bracket) affixed on top of the control unit, a vacuum meter indicator which indicates the amount of vacuum present, and a master cylinder brake reservoir top with U-bolt which fit securely over the master cylinder of an automobile or truck. The control unit is connected to the master cylinder brake reservoir top by a heavy duty dual function extractor/application hose. The master cylinder brake reservoir top can be modified to fit other motor vehicles. An extractor unit mounted on a platform with wheels, has a vacuum pump which creates a suction action for pulling brake fluid and air out of the brake system, an extractor brake fluid collection container (with holes to reduce pressure) with bracket to hold the collection container, a junction box for electrical connections, a heavy duty extraction hose which connects the extractor unit to the control unit, and a collection hose which connects the collection container to the vacuum pump.

Brown, U.S. Pat. No. 5,291,968 describes an automatic transmission fluid change apparatus including a drain pan and associated holding tank for collecting and retaining used fluid recovered from an automatic transmission. A new fluid reservoir is provided within the apparatus to contain the quantity of new fluid required for a complete change of fluid in the transmission. To accomplish a complete change of fluid in the automatic transmission, the transmission pan and filter are removed and new fluid is pumped from the new fluid reservoir to the transmission orifice to which the outlet tube of the filter is typically coupled. The vehicle engine is simultaneously run at idle speed to circulate the new fluid throughout the transmission, thereby forcing all used fluid out of the transmission for collection and storage in the holding tank.

Knorr, U.S. Pat. No. 5,415,247 describes an automotive fluid exchange system wherein new fluid (such as power steering fluid) is simultaneously exchanged with the used fluid. First and second fluid conduits having first and second pumps disposed therein, respectively, provide the passageway between an engine compartment and a container for the new and used fluid, respectively. The two pumps are selectively actuable by a respective, conventional toggle switch. Conventional jumper cables provide the power supply means to drive the pumps.

Oien, U.S. Pat. No. 5,497,864 describes a hydraulic brake bleeder apparatus for bleeding hydraulic brake fluid from a vehicle hydraulic brake system. The apparatus includes a vacuum pump for drawing brake fluid from a vehicle brake cylinder and a pneumatic motor for driving the vacuum pump. A brake fluid recovery reservoir is located beneath the vacuum pump for emptying hydraulic brake fluid drawn by the pump from a brake cylinder. A brake fluid supply container is provided for replenishing the master cylinder hydraulic brake fluid, which is drawn from the brake cylinders during a bleeding operation.

Lee et al., U.S. Pat. No. 5,964,326 describes an apparatus for bleeding and refilling hydraulic brake systems, particularly, automotive hydraulic brake system, including a bleeding unit and a refilling unit. The bleeding unit comprises a peristaltic pump having an inlet and outlet tubing for removing brake fluid and entrapped air in a hydraulic system. A collection container is provided for holding the brake fluid removed. A first electronic timer operates the pump for a predetermined length of time. An opto-sensor attached to the inlet tubing serves as an air bubble detector, on each air bubble detected, a signal is issued to start a second electronic timer which operates the pump for an additional predetermined length of time simultaneously with the first timer. When the first timer almost reaches resetting, each air bubbles detected, thereafter, will trigger the second timer to operate the pump until no more air bubbles are detected. The output signal from the opto-sensor also activates a LED and an electronic beeper to indicate the presence of each air bubble. A bleeder valve adapter is provided for preventing air leak past the threads of the bleeder valve during bleeding. The refilling unit includes a peristaltic pump having an inlet and an outlet tubing for delivering new brake fluid to a master cylinder reservoir. An electronic timer operates the pump for a predetermined length of time so as to prime the refilling unit before refilling. A first capacitive proximity sensor serving as a fluid level controller is clamped together with the outlet tubing to the master cylinder reservoir by a reservoir clamp. A second capacitive proximity sensor serving as a flow detector is attached to the inlet tubing. When flow interruption such as air or low new brake fluid level is detected, the second capacitive proximity sensor outputs a signal to light a LED and to activate an electronic beeper to indicate flow interruption. A LED controlled by the first capacitive proximity sensor is used to indicate the new brake fluid level in the master cylinder reservoir during bleeding. A collection container is provided for holding the brake fluid removed during priming of the refilling unit.

Hollub et al., U.S. Pat. No. 6,206,055 describes an apparatus and method for removing, flushing contaminants from and replacing vehicle brake fluid. The apparatus has storage tanks for fresh and waste hydraulic fluid, a fill pump to pump hydraulic fresh hydraulic fluid to the vehicle braking system, an adapter for sealably connecting a fill hose to the master cylinder, a suction pump to suction used hydraulic fluid from the vehicle braking system to the waste fluid tank, a suction hose for suctioning fluid out of the master cylinder and hoses for connecting the waste fluid tank to the bleeder valves located at the vehicle wheels. A by-pass valve is provided between the fill pump and master cylinder to by-pass fluid when the fill hose reaches or exceeds a predetermined level. A computer and ancillary electrical and fluid connections between the various parts of the apparatus and the hydraulic fluid system of a vehicle are also utilized. The apparatus can also be used when replacing the master cylinder or when replacing fluid in other hydraulic systems (i.e. hydraulic clutch).

Hollub, U.S. Pat. No. 6,302,167 describes an apparatus and method for removing and flushing hydraulic fluid and contaminants from a vehicle's or other equipment's hydraulic system, and refilling the hydraulic system with new fluid. The apparatus has a vacuum pump to remove old hydraulic fluid from the master cylinder (reservoir) and a manifold and hose system to allow all bleeder valves and the ABS valves to be vacuumed at the same time through a hose system to a waste fluid container in the apparatus, a reversing vacuum pump to transfer waste fluid from the waste fluid container in the apparatus to an exterior storage tank, a reversing fill pump to pump new fluid from the new fluid container (in the apparatus) to the universal master cylinder adapter which connects the fill hose to the master cylinder, a combination of surging fill flow and surging vacuum out flow to produce a safe rapid removal of old fluid and refill of new fluid, a cross venting system to keep moisture and other contaminants from entering the new fluid container and to keep either the new fluid or the waste fluid container from venting fumes to the atmosphere. The apparatus also has sensors to detect and correct pressures and vacuum for safety and pump life. The apparatus also has a sensor to detect fluid levels in the waste fluid container in the apparatus, and a sensor to detect the availability of new fluid available for the service. The apparatus also provides a monitored leak containment area in the bottom of the apparatus to contain any leaks and advise the service provider of a leaking condition. The vacuum pump and vacuum wand can be used to clean out the containment area.

Erwin et al., U.S. Pat. No. 6,443,192 describes a method and an apparatus for loading a tank with brake fluid in an air-free manner which is accomplished by providing a flexible diaphragm in a tank and vacuuming air out underneath the diaphragm to draw new fluid into the tank so that it can be loaded for use in pressurized flushing of brake systems on vehicles. Another aspect of the method and apparatus is an indicator on the top of the tank which warns the user when the tank is almost out of new brake fluid in order to avoid the problem in the prior art systems of running out of new brake fluid during the flushing process.

Erwin et al., U.S. Pat. No. 6,536,486 describes a method of flushing the brake system of a vehicle by administering new brake fluid to the master cylinder under pressure while at the same time suctioning with a clear wand old brake fluid from a particular bleeder valve on the vehicle with all the remaining valves closed. Once the particular valve has been adequately bled, new brake fluid will be seen coming out of the valve through the clear wand, and the valve should be closed. This procedure is repeated for each of the remaining valves one at a time until all of the bleeder valves on the vehicle have been bled. Ideally, the first valve selected should be the one furthest from the master cylinder and the last valve selected should be the one closest to the master cylinder.

Erwin et al., U.S. 2003/0037837 describes a method of flushing the brake system of a vehicle by administering new brake fluid to the master cylinder under pressure while at the same time suctioning with a clear wand old brake fluid from a particular bleeder valve on the vehicle with all the remaining valves closed. Once the particular valve has been adequately bled, new brake fluid will be seen coming out of the valve through the clear wand, and the valve should be closed. This procedure is repeated for each of the remaining valves one at a time until all of the bleeder valves on the vehicle have been bled. Ideally, the first valve selected should be the one furthest from the master cylinder and the last valve selected should be the one closest to the master cylinder.

Hollub et al., WO 01/25090 describes an apparatus and method for removing, flushing and replacing vehicle brake fluid. The apparatus has storage tanks for fresh and waste fluid, a fill pump, and adapter for connecting a fill hose to a master cylinder, a suction pump, a suction hose and a hose for connecting the waste fluid tank to bleeder valves located on the vehicle wheels.

Hollub et al., WO 01/51357 describes an apparatus and method for flushing hydraulic systems and refilling the hydraulic systems with new fluid. The apparatus has a vacuum pump for removal of old hydraulic fluid from a master cylinder and a manifold and hose system to allow bleeder valves and ABS valves to be vacuumed at the same time through a hose system to a waste fluid container in the apparatus and a reversing fill pump to pump new fluid from a new fluid container to a universal master cylinder adapter.

The prior art teaches a hydraulic brake bleeding apparatus, a device for bleeding brakes and refilling brake systems, an apparatus and method for changing automatic transmission fluid in motor vehicles, an automotive fluid exchange system, a hydraulic brake bleeder apparatus, an apparatus for bleeding and refilling hydraulic brake systems, an apparatus and method for removing and replacing vehicle hydraulic fluid, an apparatus and method for removing and replacing vehicular hydraulic fluid while flushing the hydraulic system, brake flush methods, a vehicle brake flush method and apparatus, an apparatus for removing and replacing hydraulic fluid, and an apparatus and method for flushing hydraulic brake systems, but does not teach the use of a sealed system using a pump that does not come into contact with brake fluid and wherein the brake fluid system does not require bleeding upon fluid change out. The present invention fulfills these needs and provides further related advantages as described in the following summary.

SUMMARY OF THE INVENTION

The present invention teaches certain benefits in construction and use which give rise to the objectives described below.

The present invention replaces fluid in a system using fully sealed fluid conduction tubes with a first lower port of a spent fluid container and a second lower port of a new fluid container. A fluid pump is interconnected by the fluid conductors in such manner as to suck air from a first upper port of the spent fluid container, thereby urging spent fluid from the system into the spent fluid container, and simultaneously forcing the air into a second upper port of the new fluid container thereby urging new fluid into the system to replace the spent fluid.

A primary objective of the present invention is to provide an apparatus and method of use of such apparatus that provides advantages not taught by the prior art.

Another objective is to provide such an invention capable of moving fluids between containers and the fluid system in such a manner that fluid need not flow through an exterior pump.

A further objective is to provide such an invention capable of quick and easy change of fluid without excessive skill or supervision during the process.

A further objective is to provide such an invention capable of fluid loading, fluid change-out and fluid dumping with a single closed system interconnection arrangement.

A still further objective is to provide such an invention capable of replacing fluid without spills and other potential damage to the environment because it is a closed and sealed system.

A still further objective is to provide hands free operation so that fluid is less likely to come into contact with an operator's skin.

A still further objective is to provide a method of change-out of fluid without the need for subsequent air bleeding.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above described drawing figures illustrate the invention in at least one of its preferred embodiments, which is further defined in detail in the following description.

The present invention is an apparatus for replacing fluid in system that uses fluid. As an example, the system used for describing the invention is that of an automotive style brake system, but the general approach of the inventive apparatus and its method of use can be equally applied to any fluid system such as other hydraulic systems, water filtering systems, chemical processing systems, and so on.

Figure 1:
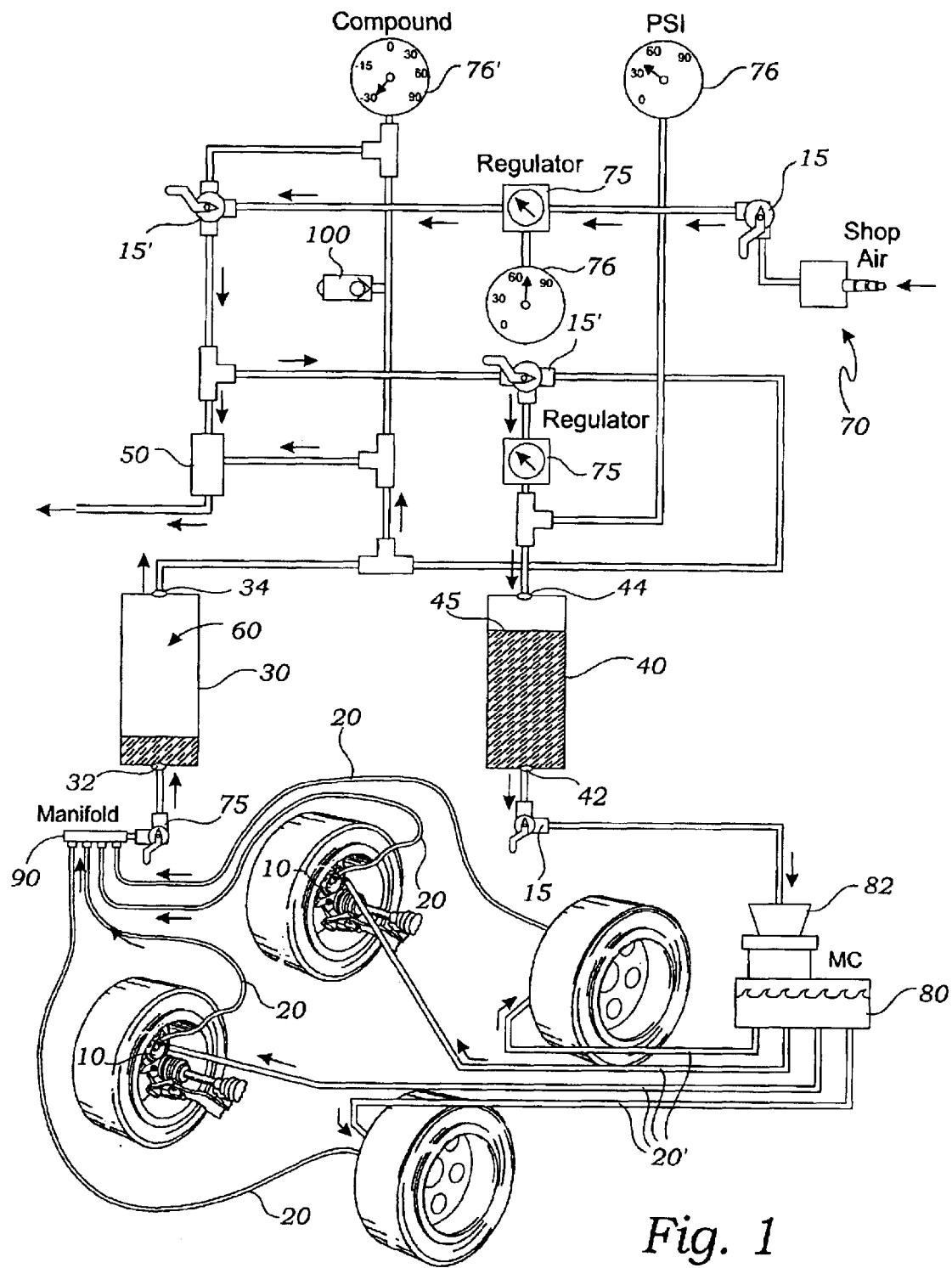
FIG. 1 is a schematic view of the preferred embodiment of the invention and particularly pointing out the manner in which a brake fluid flows when changing out a spent brake fluid for a new replacement fluid.

The fully sealed system has at least one brake cylinder 10 interconnected by a means for fluid conduction 20 with a first lower port 32 of a spent fluid container 30, and a second lower port 42 of a new fluid container 40 through lines 20' part of the vehicle brake fluid line system. A fluid pump 50 is interconnected by the fluid conducting means 20 in such manner, as shown in FIG. 1, as to suck air 60 from a first upper port 34 of the spent fluid container 30, thereby urging spent fluid 35 from the brake cylinders 10 into the spent fluid container 30. Air pressure is used to simultaneously force air into a second upper port 44 of the new fluid container 40 thereby urging new fluid 45 into the brake cylinders 10 to replaced the spent fluid 35. As can be seen by the arrows in FIG. 1, shop air is received at hose 70, passes through valve 15, regulator 75, valve 15', and through pump 50. Suction at pump 50 causes air 60 to move out of port 34 in container 30. At the same time, the shop air moves through valve 15', regulator 75 and into port 44 in container 40.

Preferably, the compressed air supply means (not shown), such as a standard garage shop air compressor with storage tank and outlet hose, is used for driving the fluid pump 50, that is, the fluid pump 50 may be of the air-driven type, but preferably is of the Bernoulli effect type, producing suction by passing an air flow through the pump 50. The important element here is that the pump 50 is an air pump and does not handle the brake fluid, 35 or 45. The fluid conduction means 20 interconnects the compressed air means through air inlet hose 70, with the fluid pump 50 as shown in FIG. 1.

Clearly, the above description applies to a single brake cylinder system as well as a standard system with plural brake cylinders 10. Automotive vehicles normally have at least four such cylinders 10 and may have as many as 24 or more such cylinders 10. In the case of plural cylinders 10, a master cylinder 80 is normally interconnected for fluid interchange between the new fluid container 40 and the brake cylinders 10 and a master manifold 90 is interconnected for fluid interchange between the brake cylinders 10 and the spent fluid container 30. In this manner all of the plural brake cylinders 10 may be fed as parallel lines at the same hydraulic pressure, and this is well known in the art being used in most automotive vehicles. An important aspect of the present invention is that the system is sealed so that fluids cannot enter or exit during the process of replacing fluids. To accomplish this, all fittings between elements 10, 30, 40, 50, 80, 90 and their interconnecting fluid conduction means 20 and 20' are tightly sealed using well known techniques and hardware. Valves 15, 15' and 15" are also sealed tightly in their joints with conduction means 20, 20' as is check valve 100. Pressure regulators 75 and pressure gauges 76, and 76' are used in the standard manner to assure that the system is operating at correct pressure. A stopper 82, having an conductor passage through it, is used to plug the inlet of master cylinder 80 so that fluid may flow from container 40 to the cylinder 80 without exposing the system to outside venting. This is considered an important aspect of the present invention.

In applying the above apparatus the preferred method includes interconnecting the above described elements as a fully sealed system using the means for fluid conduction 20, 20' including interconnecting the plurality of brake cylinders 10 with the first lower port 32 of the spent fluid container 30 and interconnecting the second lower port 42 of the new fluid container 40 with the fluid conducting means 20 with the brake cylinders 10 as well. The latter connections are made to the pressure port of the brake cylinders 10 while the former connections are made to the bleed port of the brake cylinders 10. The fluid pump 50 is interconnected with the first upper port 34 of the spent fluid container 30. The source of air pressure is interconnected with the second upper port 44 of the new fluid container 40 as shown in FIG. 1. The method then includes further, sucking the air 60 from the first upper port 34 of the spent fluid container 30, thereby urging spent fluid 35 from the brake cylinders 10 into the spent fluid container 30, and simultaneously forcing air from the source of air pressure into the second upper port 44 of the new fluid container 40 thereby urging new fluid 45 into the brake cylinders 10 to replace the spent fluid 35. Both the suction and pressure operations occur simultaneously so that fluid flows through the system without air entrainment into the fluid.

The method further comprises the step of interconnecting the compressed air means with the fluid pump 50 for driving said pump and this is accomplished using inlet hose 70. When multiple brake cylinders 10 are involved, the method includes the step of interconnecting the master cylinder 80 between the new fluid container 40 and the brake cylinders 10 at the brake fluid inlet port (not separately shown) and preferably also includes the step of interconnecting the master manifold 90 between the spent fluid container 30 and the brake cylinders 10 at the bleed port (not separately shown).

Figure 2:
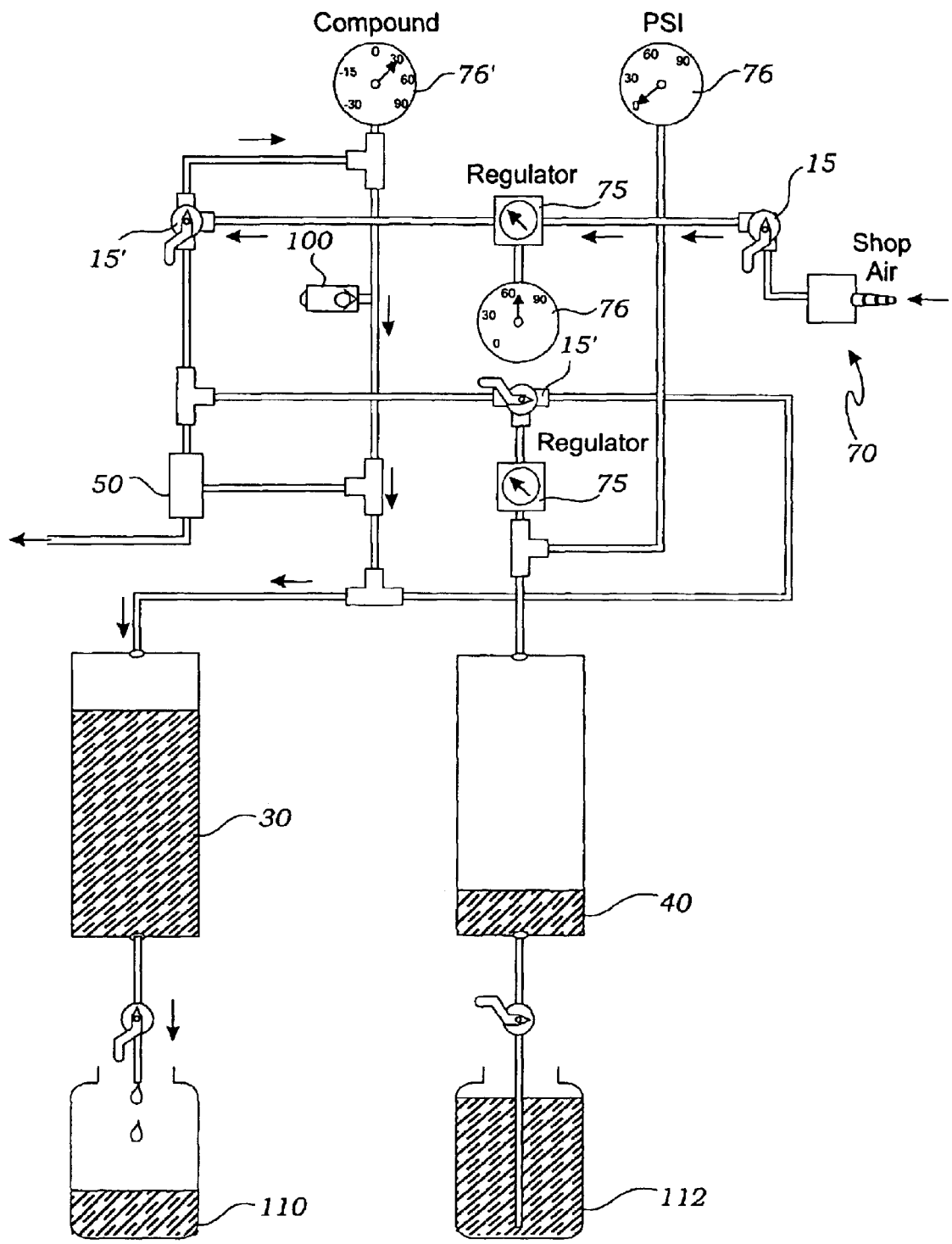
FIG. 2 is similar to FIG. 1 pointing out how the system may be used to dispense the spent fluid.

It is seen in FIG. 2, that with the spent fluid fully purged from the brake cylinder(s) and fully installed within spent fluid container 30, valve 15 below container 30 may be used to pressurize release the spent fluid 35 may be drained into a receptacle 110. To accomplish this, shop air is inlet into port 34 driving the spent fluid 35 out of container 30. Before opening valve 15 below container 30, container 30 may be pressurized so that drainage may be accomplished at a selected drain site.

Figure 3:
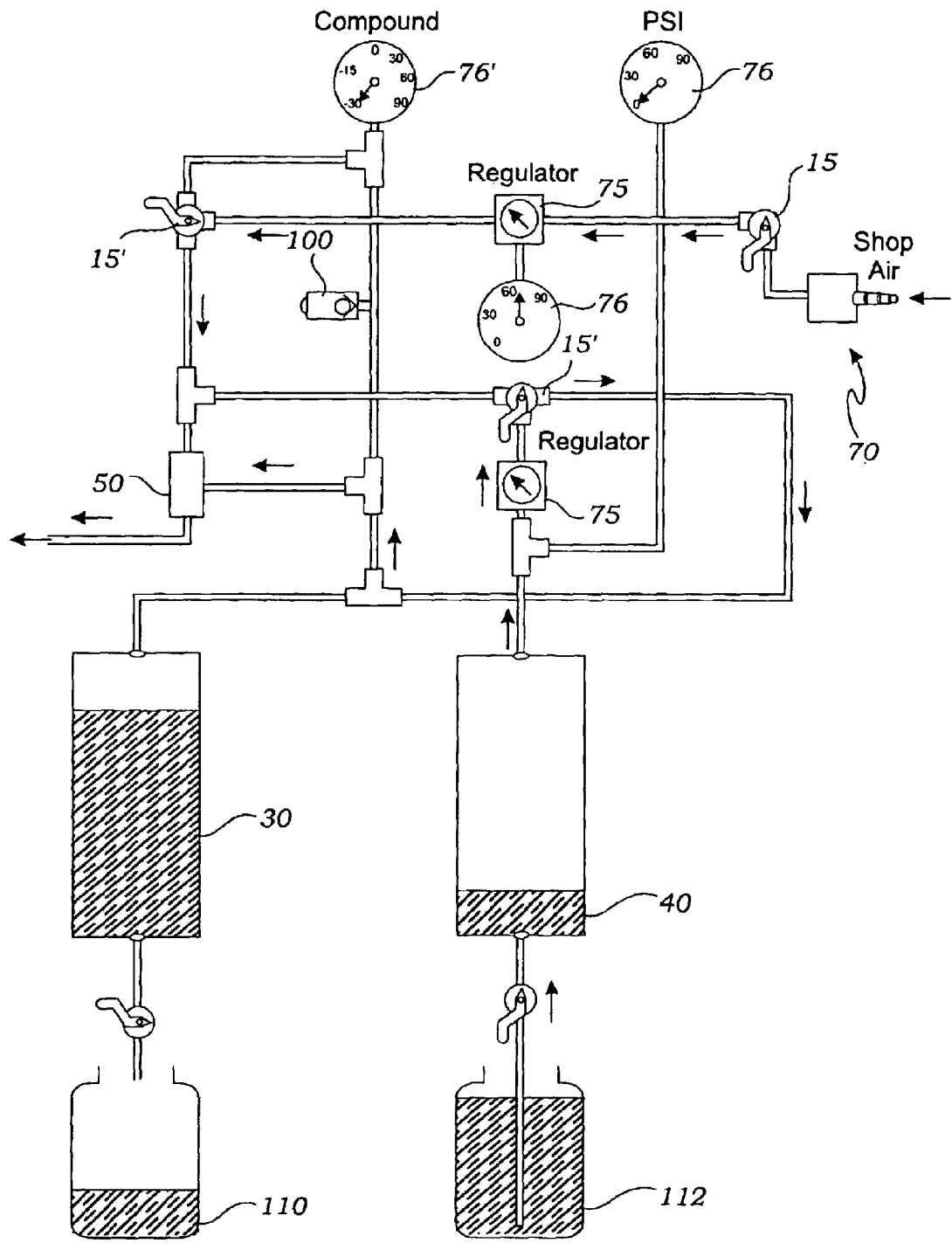
FIG. 3 is similar to FIG. 1 pointing out how the system may be used to receive replacement fluid.

It is seen in FIG. 3 that suction may be applied to port 44 of container 40 so as to draw new brake fluid 45 into container 40. Thus it is clear that the system shown in FIGS. 1–3 is able to replace brake fluid in a brake system, draw new fluid into a storage container into the system and drain spent fluid from the system with only the manipulation of several valves 15 and 15'.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An apparatus for replacing a fluid comprising: a fully sealed system interconnected by a means for fluid conduction with a first lower port of a spent fluid container and a second lower port of a new fluid container; a fluid pump interconnected by the fluid conducting means in such manner as to suck air from a first upper port of the spent fluid container, thereby urging spent fluid from the system into the spent fluid container, and a source of air pressure interconnected by the fluid conducting means with a second upper port of the new fluid container for urging new fluid into the system thereby replacing the spent fluid.

2. The apparatus of claim 1 wherein the source of air pressure is joined to the fluid pump for producing suction therein by the Bernoulli effect.

3. An apparatus for replacing brake fluid comprising: a fully sealed system having plural brake cylinders interconnected in parallel by a means for fluid conduction with a first lower port of a spent fluid container and a second lower port of a new fluid container; a fluid pump interconnected by the fluid conducting means in such manner as to suck air from a first upper port of the spent fluid container, thereby urging spent fluid from the brake cylinders into the spent fluid container, and a source of air pressure interconnected by the fluid conducting means with a second upper port of the new fluid container for urging new fluid into the brake cylinders thereby replacing the spent fluid.

4. The apparatus of claim 3 wherein the source of air pressure is interconnected with the fluid pump for producing the Bernoulli effect therein.

5. The apparatus of claim 3 further comprising a master cylinder interconnected for fluid interchange between the new fluid container and the brake cylinders.

6. The apparatus of claim 3 further comprising a master manifold interconnected for fluid interchange between the brake cylinders and the spent fluid container.

7. The apparatus of claim 6 wherein a stopper is used to seal an inlet of the master cylinder.

8. An apparatus for replacing brake fluid comprising: a fully sealed system having a brake cylinder interconnected by a means for fluid conduction with a first lower port of a spent fluid container and a second lower port of a new fluid container; a fluid pump interconnected by the fluid conducting means in such manner as to suck air from a first upper port of the spent fluid container, thereby urging spent fluid from the brake cylinder into the spent fluid container, and a source of air pressure interconnected by the fluid conducting means with a second upper port of the new fluid container for urging new fluid into the brake cylinder thereby replacing the spent fluid.

9. The apparatus of claim 1 wherein the source of air pressure is joined to the fluid pump for producing suction therein by the Bernoulli effect.

10. A method for replacing brake fluid comprising the steps of: providing a fully sealed system having plural brake cylinders; interconnecting the brake cylinders in parallel using a means for fluid conduction, the brake cylinders joined with a first lower port of a spent fluid container and a second lower port of a new fluid container; interconnecting a fluid pump so as to suck air from a first upper port of the spent fluid container, thereby urging spent fluid from the brake cylinders into the spent fluid container; interconnecting a source of air pressure with a second upper port of the new fluid container thereby urging new fluid into the brake cylinders to replace the spent fluid.

11. The method of claim 10 further comprising the step of interconnecting the source of air pressure is with the fluid pump for producing the Bernoulli effect therein.

12. The method of claim 10 further comprising the step of interconnecting a master cylinder for fluid interchange between the new fluid container and the brake cylinders.

13. The method of claim 10 further comprising the step of interconnecting a master manifold for fluid interchange between the brake cylinders and the spent fluid container.

14. The method of claim 13 further comprising the step of placing a stopper to seal an inlet of the master cylinder.

* * * * *